US008688048B2

(12) United States Patent
Gaikwad et al.

(10) Patent No.: US 8,688,048 B2
(45) Date of Patent: Apr. 1, 2014

(54) RSSI SLOPE CALIBRATION TECHNIQUE

(75) Inventors: Rohit V. Gaikwad, San Diego, CA (US); Jason A. Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 2030 days.

(21) Appl. No.: 10/817,094

(22) Filed: Apr. 2, 2004

(65) Prior Publication Data

US 2005/0113030 A1 May 26, 2005

Related U.S. Application Data

(60) Provisional application No. 60/525,357, filed on Nov. 26, 2003.

(51) Int. Cl.
*H04B 17/00* (2006.01)

(52) U.S. Cl.
USPC ....... 455/67.11; 455/78; 455/67.14; 455/423; 455/446; 455/226.1; 455/226.2; 375/224; 375/228

(58) Field of Classification Search
USPC ............... 455/115.1, 115.2, 226.1, 226.2, 78, 455/67.11, 67.14, 423, 446; 375/228, 224
See application file for complete search history.

(56) References Cited

U.S. PATENT DOCUMENTS

| 5,999,803 | A * | 12/1999 | Kim | 455/226.2 |
|---|---|---|---|---|
| 6,272,322 | B1 * | 8/2001 | Su | 455/67.14 |
| 6,603,810 | B1 * | 8/2003 | Bednekoff et al. | 375/228 |
| 6,704,352 | B1 * | 3/2004 | Johnson | 375/224 |
| 6,801,788 | B1 * | 10/2004 | Csapo et al. | 455/561 |
| 7,212,798 | B1 * | 5/2007 | Adams et al. | 455/251.1 |
| 2004/0063412 | A1 * | 4/2004 | Kim et al. | 455/226.2 |
| 2004/0064281 | A1 * | 4/2004 | Kim | 702/107 |
| 2005/0079841 | A1 * | 4/2005 | Astrachan et al. | 455/226.2 |
| 2005/0095993 | A1 * | 5/2005 | Kim et al. | 455/78 |

* cited by examiner

*Primary Examiner* — Zhiyu Lu
(74) *Attorney, Agent, or Firm* — Garlick & Markison; Bruce E. Garlick

(57) ABSTRACT

A method of calibrating the slope of a received signal strength indicator circuit is disclosed. An embodiment of the present invention may adjust for manufacturing process, power supply voltage, and ambient temperature variations by periodically calibrating the measurement of receive signal strength in a RF communication device, using the transmitter of the device. Various embodiments of the present invention may use a look-up table to convert unadjusted receive signal strength values to adjusted receive signal strength values, may adjust the operation of the circuitry generating an indication of receive signal strength, and may adjust thresholds in executable code used to manage the operation of the radio frequency communication system.

22 Claims, 9 Drawing Sheets

RSSI SLOPE CALIBRATION TECHNIQUE

RELATED APPLICATIONS

This application makes reference to, claims priority to, and claims the benefit of U.S. Provisional Patent Application Ser. No. 60/525,357, entitled "A RSSI Slope Calibration Technique", filed Nov. 26, 2003, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The use of wireless local area networks (LANs) is growing at an ever-increasing rate. In addition, the data rates of such wireless LANs are continually rising. The algorithms used to manage and optimize wireless LAN receiver performance rely on having an accurate measurement of the strength of the received radio frequency (RF) signal to be able to properly optimize system performance. The measurement of received signal strength is referred to as a received signal strength indicator (RSSI), and may be developed in either the analog or the digital domain. The generation of a RSSI value using analog circuitry is the more frequently used approach, due to its ability to represent a wider dynamic range in fewer bits of information. The operation of the analog signal processing circuitry in such devices, however, is significantly affected by a number of factors including, for example, variations in power supply voltages, changes in operating temperature, and the processes by which the devices in the circuitry were fabricated. These factors are referred to as process, voltage, and temperature (PVT) variations. Errors in the receive signal strength indication that result from PVT variations may cause the receiver in a wireless LAN to malfunction, or to perform in a sub-optimal fashion. This may result in reduced operating range and/or unacceptable data error rates.

In order to reduce the effects of PVT variations, designers of RF communication equipment such as, for example, wireless LAN systems may incorporate compensating functionality into the analog portions of the receiver design, in an attempt to make the receiver less sensitive to PVT variations. Implementing this compensating functionality typically involves additional circuit components that require resources such as additional area in integrated circuit devices, and additional power for operation. The resources needed to meet the increasingly stringent requirements of advancing wireless LAN standards may raise the complexity of the required integrated circuits to a point where a design using analog compensating functionality is rendered too complex or too expensive for the intended application.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be seen in a method of operating a radio frequency communication system having a receiver portion and a transmitter portion. Such a method may comprise arranging the transmitter portion and the receiver portion in a first configuration, taking a first signal power measurement, configuring the transmitter portion and the receiver portion in a second configuration, performing a second signal power measurement, and adjusting the operation of the receiver portion based upon the first signal power measurement and the second signal power measurement. In an embodiment of the present invention, the arranging, taking, configuring, performing, and adjusting may occur on a periodic basis. The radio frequency communication system may communicate digital information, and the receiver portion and the transmitter portion may be located within the same integrated circuit. The adjusting may comprise calibrating at least one of the slope and the fixed offset of a receive signal strength indicator, and the adjusting may comprise modifying the value of a receive signal strength indicator using an affine function. The affine function in an embodiment of the present invention may be implemented using a look-up table. The adjusting may also comprise modifying at least one threshold related to the processing of receive signal strength indicator data used in the operation of the radio frequency communication system. In addition, the adjusting may comprise modifying at least one of a receive signal strength indicator slope and a receive signal strength indicator fixed offset in an analog receive signal strength indicator circuit.

In an embodiment in accordance with the present invention, the arranging may provide a relatively lower level of radio frequency signal to the receiver portion. The relatively lower level of radio frequency signal may correspond to a signal power of less than approximately −90 dBm. The configuring may provide a relatively higher level of radio frequency signal to the receiver portion, and the relatively higher level of radio frequency signal may correspond to a signal power of greater than approximately −30 dBm. An embodiment of the present invention may also comprise adjusting the operation of the transmitter portion based upon the first signal power measurement and the second signal power measurement.

Additional aspects of the present invention may be found in a radio frequency communication system comprising transmitter circuitry for generating a radio frequency signal. The output of the transmitter circuitry may be coupled to at least one antenna. Such a system may comprise switching circuitry having an input coupled to the at least one antenna, and an output. The switching circuitry may have at least a first mode and a second mode of operation, where the first mode of the switching circuitry may pass a signal from the input to the output with a relatively lower level of attenuation, and the second mode of the switching circuitry may pass a signal from the input to the output with a relatively higher level of attenuation. An embodiment of the present invention may also comprise receiver circuitry for accepting a radio frequency signal from the output of the switching circuitry. The receiver circuitry may produce at least a receive signal strength indicator. The radio frequency communication system may adjust at least one characteristic of the receive signal strength indicator using the switching circuitry and the transmitter circuitry.

In an embodiment of the present invention, the adjusting may be performed on a periodic basis. The radio frequency communication system may communicate digital information, and the receiver circuitry and the transmitter circuitry may be located within the same integrated circuit. The at least one characteristic may comprise at least one of the slope and the fixed offset of the receive signal strength indicator. In an embodiment in accordance with the present invention, the adjusting may comprise modifying the value of the receive signal strength indicator using an affine function, and the affine function may be implemented using a look-up table. In yet another embodiment of the present invention, the adjusting may comprise modifying at least one threshold related to receive signal strength indicator data used in the operation of the radio frequency communication system.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the present invention relate in general to the optimization of the operation of a radio frequency communication system. More specifically, aspects of the present invention comprise a method of calibrating receive signal strength indication circuitry to minimize the effects of fabrication process, power supply voltage, and ambient temperature variations upon system performance. Although aspects of the present invention may be discussed below with respect to the communication of data, various aspects of the present invention have practical application in RF communication systems in which other forms of signals are communicated using a wireless link.

Figure 1:
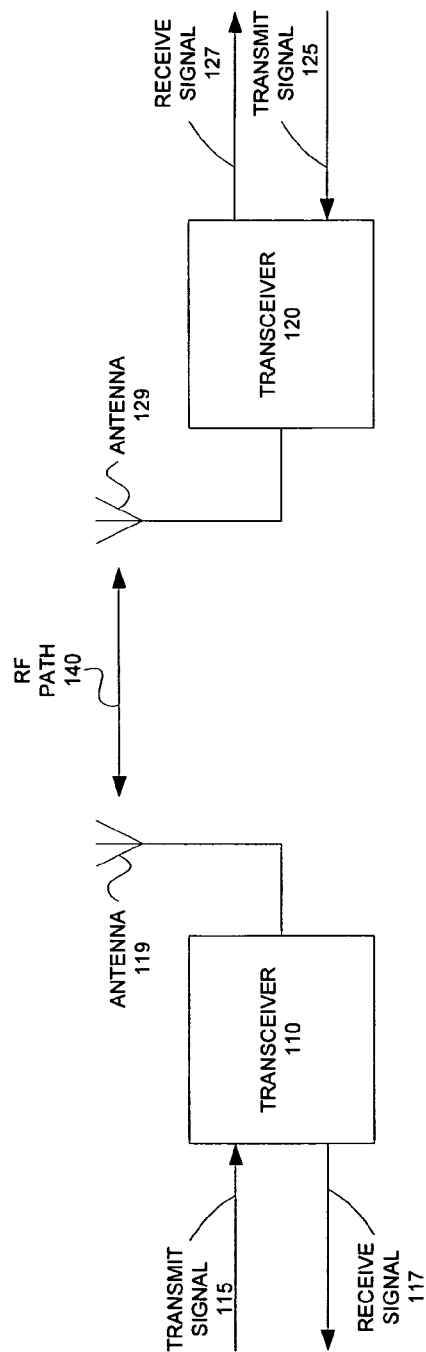
FIG. 1 shows a block diagram of a wireless data communication system in which an embodiment of the present invention may be practiced.

FIG. 1 shows a block diagram of a wireless data communication system 100 in which an embodiment of the present invention may be practiced. The illustration of FIG. 1 shows two transceivers 110, 120 in radio frequency (RF) communication via antennas 119, 129 and RF path 140. It is a function of each of transceivers 110, 120 to convert transmit signals 115, 125 to radio frequency signals to be received by the other of the transceivers 110, 120, and to convert received RF signals to receive signals 117, 127. Although only two transceivers are shown in FIG. 1, this is for reasons of clarity, and does not represent a limitation of the present invention. In addition, although the antennas 119, 129 are each shown as a single antenna coupled to the respective transceivers 110, 120, each of the antennas 119, 120 may comprise two or more antennas, without departing from the spirit or scope of the present invention. In various embodiments of the present invention, multiple antennas may be used for each of the antennas 119, 120 to support, for example, diversity, beamforming, or space-time coded systems. The accuracy of the communication of the transmit signal 115 of transceiver 110 to transceiver 120 as receive signal 127, and similarly the transmit signal 125 of transceiver 120 to transceiver 110 as receive signal 117 depends upon a number of factors including, for example, the length of the RF path 140 between the transceivers 110, 120, the power level of the RF signal transmitted by the transceivers 110, 120, any sources of interference along RF path 140, and the gain provided by antennas 119, 129, to name only a few.

In an embodiment of the present invention, each of the transceivers 110, 120 may comprise an analog portion for receiving and transmitting RF signals using antennas 119, 129, respectively, and a digital portion that may, among other things, function to manage the operation of the associated analog portion. The digital portion of the transceivers 110, 120 may monitor the power of the received RF signal using, for example, a received signal strength indicator (RSSI). The received signal strength indicator may be used, for example, in performing automatic gain control (AGC), to derive a signal quality indication, in transmit power control, and in various calibration techniques. As described above, a RSSI value may be developed in either the analog or the digital domain. The accuracy of RSSI signal values generated in the analog domain may be significantly affected by a number of factors including variations in, for example, ambient temperature, power supply voltage, and manufacturing processes. The accuracy of analog-to-digital converters used to convert an analog RSSI measurement to a digital value may also be affected by the above factors. An embodiment of the present invention minimizes the effects of such factors upon a RSSI signal by performing a calibration of the slope of the actual RSSI signal to that of an expected RSSI signal used by operational algorithms.

Figure 2:
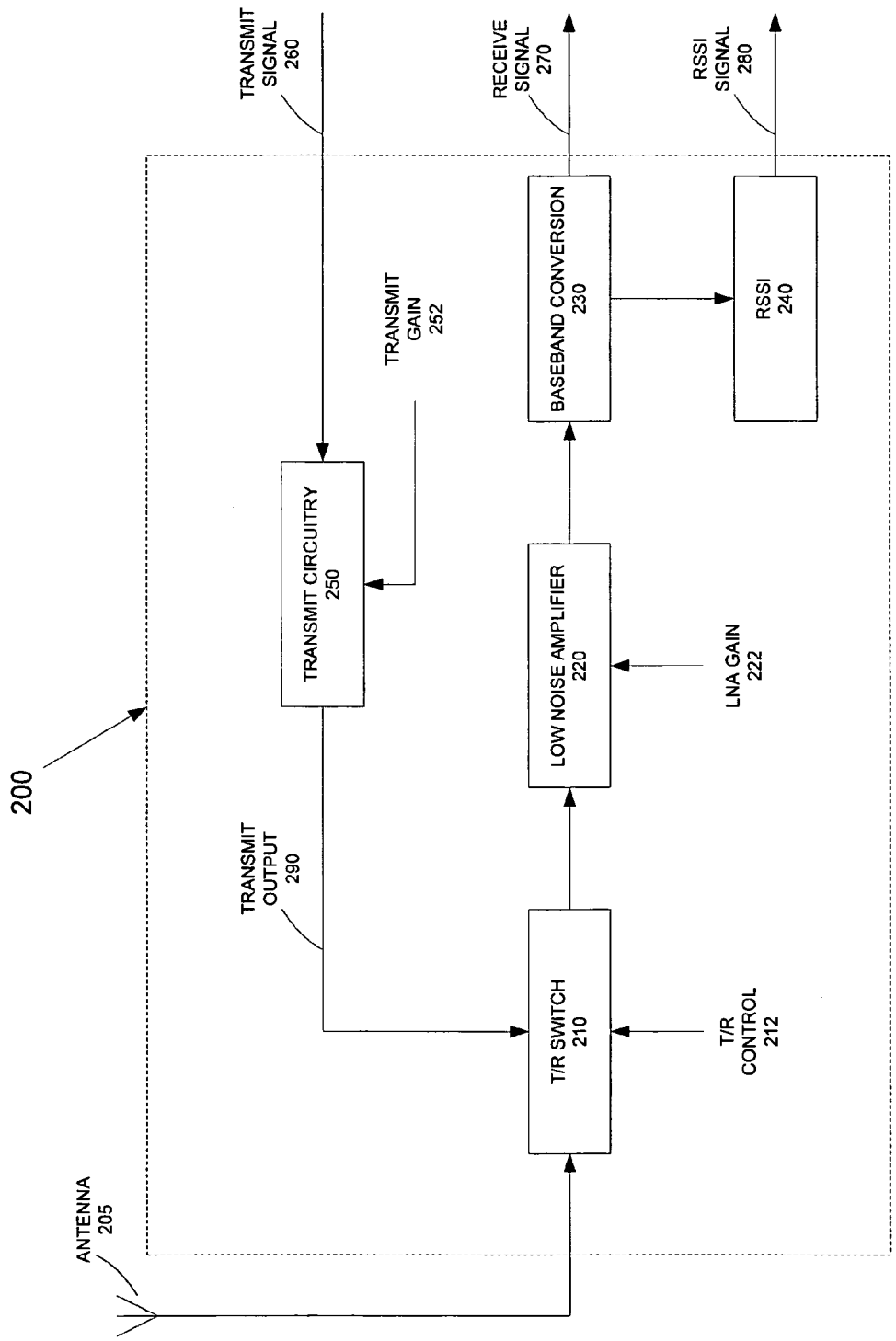
FIG. 2 shows a block diagram of an exemplary analog RF portion of a transceiver that may, for example, correspond to the analog RF portion of the transceivers of FIG. 1, in accordance with an embodiment of the present invention.

FIG. 2 shows a block diagram of an exemplary analog RF portion 200 of a transceiver that may, for example, correspond to the analog RF portion of the transceivers 110, 120 of FIG. 1, in accordance with an embodiment of the present invention. The analog RF portion 200 is characterized by a transmit path and a receive path. The transmit path of the analog RF portion 200 comprises transmit circuitry 250, transmit/receive (T/R) switch 210, and an antenna 205. The transmit circuitry 250 receives transmit signal 260 and generates a modulated RF transmit output signal 290. The transmit output signal 290 is coupled through the T/R switch 210 to the antenna 205, for communication to a remote transceiver such as, for example, another of the transceivers 110, 120 of FIG. 1. It should be noted that although the antenna 205 is shown in FIG. 2 as a single antenna, this is not representative of a limitation of the present invention. In various embodiments of the present invention, the antenna 205 may comprise multiple antennas in order to take advantage of, for example, diversity, beamforming, or space-time coded systems. The transmit circuitry 250 also accepts a transmit gain signal 252, that permits the adjustment of the power level of the transmit output signal 290.

The receive path of the analog RF portion 200 of FIG. 2 comprises the T/R switch 210, a low noise amplifier (LNA) 220, baseband conversion circuitry 230, and a RSSI circuit 240. The input of the T/R switch 210 is coupled to the antenna 205, that receives the transmit signal from another RF communication device such as the transceivers 110, 120. The T/R switch 210 may be configured in either a receive or a transmit mode of operation. In receive mode, the T/R switch 210 provides a low-loss connection from the antenna 205 to the input of the LNA 220. In transmit mode, the T/R switch 210 passes the transmit output signal 290 to the antenna 205, attenuates the transmit output signal 290 from the transmit circuitry 250, and provides the attenuated transmit output signal 290 to the input of the LNA 220. In an embodiment of the present invention, the T/R switch 210 may, for example, attenuate the transmit output signal 290 that is passed to the input of the LNA 220 by approximately 24 dB, when in the transmit mode.

The LNA 220 receives a RF signal from the output of the T/R switch 210, amplifies it, and passes the amplified signal to the baseband conversion circuit 230. The LNA 220 of FIG. 2 is configured with a LNA gain input 222 that permits the amount of amplification of the LNA 220 to be adjusted. In one embodiment of the present invention, the LNA 220 may provide a level of gain between approximately 25 dB and approximately −10 dB. The baseband conversion circuit 230 converts the RF signal received from the LNA 220 to receive signal 270. The RSSI circuit 240 is coupled to the baseband conversion circuit 230, and generates a RSSI signal 280 that may be used as described above in managing the operation of the analog RF portion 200. The RSSI circuit 240 may process wideband signals, narrowband signals, or a combination of wideband and narrowband signals in the generation of the RSSI signal 280.

Figure 3:
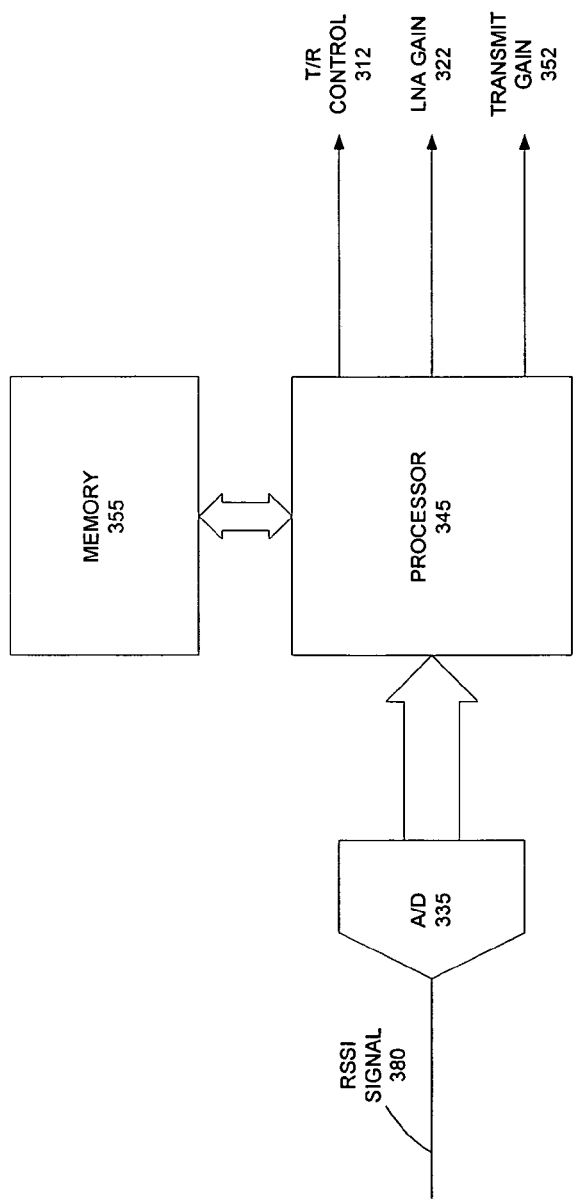
FIG. 3 shows a block diagram illustrating an exemplary digital portion of a RF communication device that may, for example, correspond to the digital portion of the transceivers of FIG. 1, in accordance with an embodiment of the present invention.

FIG. 3 shows a block diagram illustrating an exemplary digital portion 300 of a RF communication device that may, for example, correspond to the digital portion of the transceivers 110, 120 of FIG. 1, in accordance with an embodiment of the present invention. The digital portion 300 comprises an analog-to-digital (A/D) converter circuit 335, a processor 345, and a memory 355. The memory 355 may comprise, for example, non-volatile or volatile memory, and may be used to store executable code or data, for use by the processor 345. In various embodiments of the present invention, the memory 355 may be contained within the processor 345. The A/D converter circuit 335 receives the RSSI signal 380 from an RSSI circuit such as, for example, the RSSI circuit 240 of FIG. 2. The digitized RSSI value generated by the A/D converter circuit 335 is then passed to the processor 345. In an embodiment of the present invention, the digitized RSSI value generated by the A/D converter circuit 335 may, for example, range from a value of +32, corresponding to the lowest received signal power, to a value of −31, corresponding to the greatest received signal power. It is a function of the algorithms represented by the executable code contained in the memory 355 to direct the processor 345 to make operational decisions based, in part, upon the digitized RSSI value received from the A/D converter 335. The results of those decisions may be reflected in the states of the T/R control signal 312, the LNA gain signal 322, and the transmit gain signal 352 that may correspond to, for example, the T/R control signal 212, the LNA gain signal 222, and the transmit gain signal 252 of FIG. 2.

Figure 4:
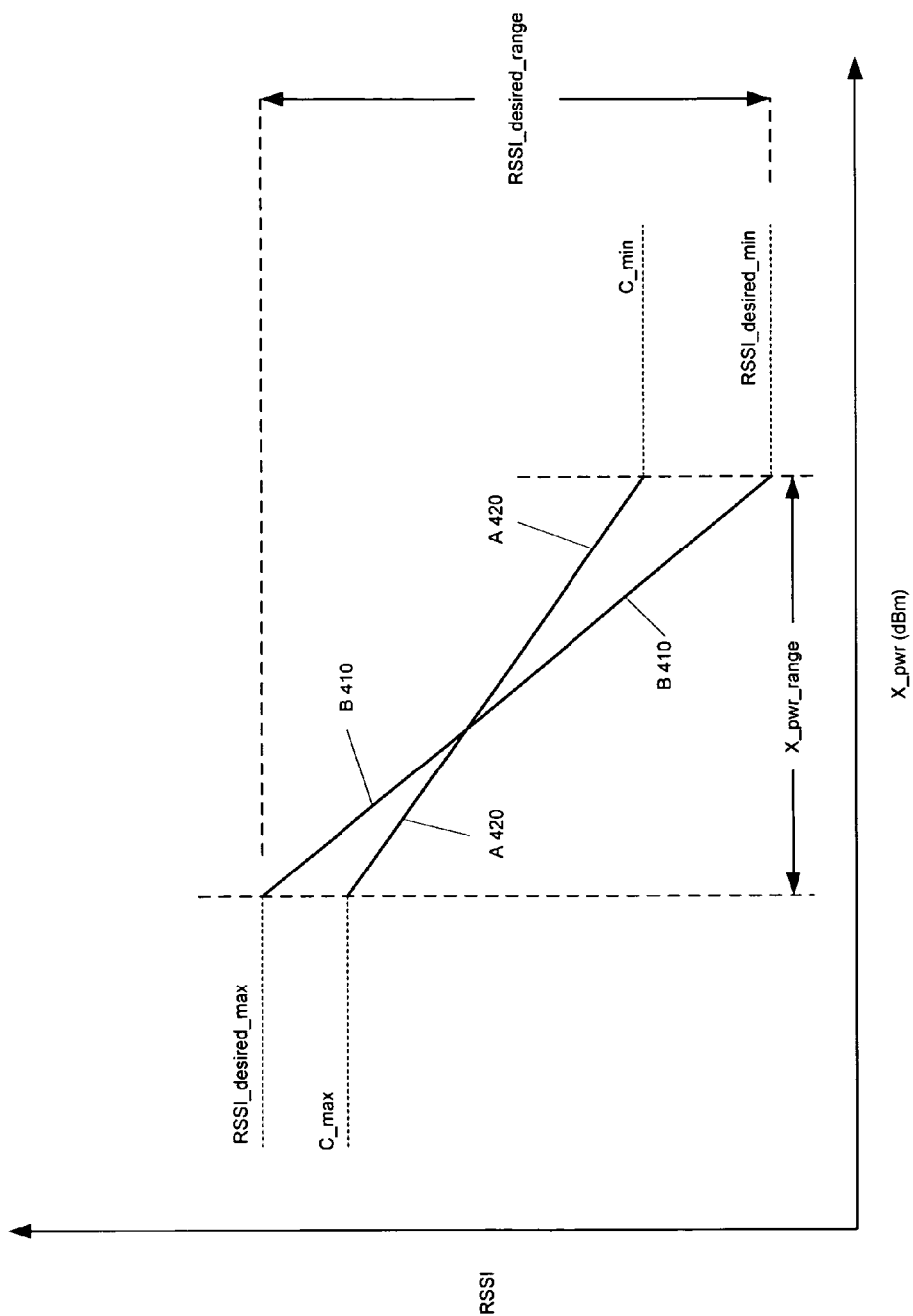
FIG. 4 shows a curve A representing the actual/observed range of an RSSI signal such as the RSSI signal generated by the RSSI circuit of FIG. 2, and a curve B representing the expected/desired range of the RSSI signal for use by the algorithms executed by the processor of FIG. 3, in accordance with an embodiment of the present invention.

FIG. 4 shows a curve A 420 representing the actual/observed range of an RSSI signal such as the RSSI signal 280 generated by the RSSI circuit 240 of FIG. 2, and a curve B 410 representing the expected/desired range of the RSSI signal for use by the algorithms executed by the processor of FIG. 3, in accordance with an embodiment of the present invention. The following discussion of FIG. 4 will be with reference to the entities shown in FIGS. 1-3. As can be seen in FIG. 4, over the range of receive signal power, X_pwr_range, the actual/observed RSSI signal from a RSSI circuit such as, for example, the RSSI circuit 240 of FIG. 2, may vary from C_max to C_min. The values of C_max and C_min may vary based upon the behavior of circuit elements such as, for example, the power detector (not shown) within RSSI circuit 240 of FIG. 2, and/or the range and offset of the A/D converter circuit 335 of FIG. 3. An embodiment of the present invention may be used to compensate for such sources of error by allowing for adjustment of the slope and fixed offset of the RSSI signal. In an embodiment of the present invention, the RSSI circuit 240 may, for example, operate over a received signal power range of −90 dBm to −30 dBm, with the T/R switch 210 configured in the receive (low attenuation) mode. The value C_max represents the maximum actual or observed value of the RSSI signal 280 as output by the RSSI circuit 240. For the illustration of FIG. 4, the maximum value occurs when the analog RF portion 200 of the transceiver is receiving a RF signal at a power level below which the RSSI signal 280 does not change. The value C_min represents the minimum actual/observed output value of the RSSI signal 280 of the RSSI circuit 240. For the circuit behavior illustrated in FIG. 4, this occurs when the analog RF portion 200 of the transceiver is receiving a signal at a power level above which the level of the RSSI signal 280 does not change. It should be noted that although the illustration of FIG. 4 shows a circuit behavior in which the RSSI signals are in inverse relation to the level of received signal power (i.e., a higher RSSI voltage or digital value corresponding to a lower received signal power), this is not a limitation of the present invention. An embodiment of the present invention may also be employed where the RSSI value and the received signal power level are in a direct relationship. In addition, it should be noted that although the illustration of FIG. 4 shows that C_max is less than RSS_desired_max, and that C_min is greater than RSSI_desired_min, the present invention is not limited in this respect.

The range of the RSSI values represented by curve B 410 may be the RSSI signal values expected by the algorithms executed by the processor 345 of FIG. 3. The range of expected values may contain a number of thresholds used by the algorithms executed by processor 345 in managing the operation of the analog RF portion 200. The range of values and of the thresholds used may be defined in the executable code used by processor 345. The executable code of the processor 345 is normally defined at the time of manufacture of the transceivers 110, 120, and is the same for each of many units manufactured. Therefore, although the exact characteristics of the devices used and the ambient temperature and power supply voltages may vary, any decision made by the algorithms executed by the processor 345 may be related to fixed values or thresholds in the executable code. The PVT variations described above cause curve A 420 of the actual/observed RSSI values to differ from the curve B 410 of those RSSI values anticipated by the designers, and embodied in the code executed by the processor 345. This variance in the curve A 420 of actual/observed RSSI values from the curve B 410 of expected/desired RSSI values results, at least in part, from deviations in the operation of the analog RF portion 200 from circuit performance expected by the designers. This error results from the PVT variations (i.e., changes in the ambient temperature, the circuit supply voltage, and device manufacturing process) described above.

In one embodiment of the present invention, the effects of an error in the slope of the actual/observed RSSI curve A 420 from the slope of the expected/desired RSSI curve B 410 may be minimized by defining an affine relation of the actual/observed RSSI values represented by curve A 420, to the expected/desired values, represented by curve B 410. This relation may be defined in terms of the maximum and minimum possible actual/observed RSSI values, C_max and C_min, of the RSSI signal 280 generated by the RSSI circuit 240. An embodiment of the present invention may determine the maximum actual/observed RSSI value, C_max, by configuring the circuitry of the analog RF portion 200 in a manner that causes the receive path, as described above, to receive a RF signal at or below the RF signal power level corresponding to C_max. This may be accomplished by processor 345 setting the T/R control signal 212 to configure the T/R switch 210 in transmit mode, the LNA gain signal 222 to configure the LNA 220 for minimum gain, and the transmit gain signal 252 to configure the transmit circuitry 250 for minimum RF power in the transmit output 290. The value of the RSSI signal 280 generated by the RSSI circuit 240 is then digitized by the A/D converter 335, and the digitized value of the RSSI signal 280 stored in, for example, the memory 355.

An embodiment of the present invention may also determine the minimum actual/observed RSSI value, C_min, by configuring the circuitry of the analog RF portion 200 in a manner that causes the receive path, as described above, to receive a RF signal at or above the RF signal power level corresponding to C_min. This may accomplished by the processor 345 setting the T/R control signal 212 to configure the T/R switch 210 in receive mode, the LNA gain signal 222 to configure the LNA 220 for maximum gain, and the transmit gain signal 252 to configure the transmit circuitry 250 for maximum RF power in the transmit output 290. A known transmit signal 260 (e.g., a complex sinusoid at baseband) may then be passed to the transmit circuitry 250. Because the transmit output 290 of the transmit circuitry 250 is directly coupled to the input of the T/R switch 210, the maximum power signal is passed directly into the receive path of the analog RF portion 200. The value of the RSSI signal 280 generated by the RSSI circuit 240 is then digitized by the A/D converter 335, and the digitized value of the RSSI signal 280 is stored in, for example, the memory 355.

An affine relation of the digitized actual/observed RSSI signal 280 to the expected/ideal RSSI used by the algorithms used by processor 645 may be defined as follows. The curve of actual/observed RSSI values, RSSI_meas, shown in FIG. 3 as curve A 420, may be described by the following equation:

$$RSSI\_meas = [(C\_max - C\_min)/X\_pwr\_range] * X\_pwr + C\_min$$

The relationship between the expected/desired RSSI, RSSI_desired, shown by curve B 410 in FIG. 3, may be expressed as:

$$RSSI\_desired = [(RSSI\_desired\_range)/X\_pwr\_range] * X\_pwr + RSSI\_desired\_min$$

where RSSI_desired_range is the difference between the maximum expected/desired RSSI, RSSI_desired_max, and the minimum expected/desired RSSI, RSSI_desired_min, over the range of receive RF signal power, X_pwr_range.

Using the equations for RSSI_meas and RSSI_desired, above, the value of RSSI_desired may be written in terms of the actual/observed (i.e., measured) RSSI, RSSI_meas, and the maximum and minimum actual/observed $RSS_1$, C_max and C_min, respectively:

$$RSSI\_desired = [(RSSI\_desired\_range)/(C\_max - C\_min)] * (RSSI\_meas - C\_Min) + RSSI\_desired\_min$$

The above equation, therefore, defines a relationship between the curve A 420 of the actual/observed RSSI values generated by a RSSI circuit such as the RSSI circuit 240 of FIG. 2, and the curve B 410 of the RSSI values expected by the operational algorithms of the RF communication system. This relationship may be used to adjust an actual/observed RSSI to an expected/desired RSSI. In an embodiment of the present invention, this relationship may be expressed within the executable code processed by processor 345. In one embodiment of the present invention, the value of RSSI_desired may be calculated as needed using the above relationship. In an alternative embodiment of the present invention, the relationship may be implemented as entries in a look-up table. Such a look-up table may be constructed using the digitized value of the actual/observed RSSI as an index. For example, using the range of digitized RSSI values described above, an embodiment of the present invention may use a look-up table having 64 entries. The expected/desired RSSI value corresponding to each actual/observed RSSI index value may then be computed and stored in the look-up table at the time of RSSI slope calibration. The digitized actual/observed RSSI measurements from the A/D converter 335 may then be used as an index into the look-up table, to access the corresponding expected/desired RSSI value.

As described above, the variance between the actual/observed RSSI and the expected/desired RSSI results primarily from three factors. The relationship between the actual/observed RSSI values represented by curve A 420, and the expected/desired RSSI values represented by curve B 410 may change during operation, due to changes in power supply voltage and ambient temperature. An embodiment may perform the RSSI slope calibration described above at the time of power-up of the RF communication equipment. In addition, an embodiment of the present invention may periodically perform the calibration of the RSSI slope during equipment operation, to ensure that the expected RSSI values accurately reflect the actual/observed values for the current operating voltages and ambient temperature.

Figure 5:
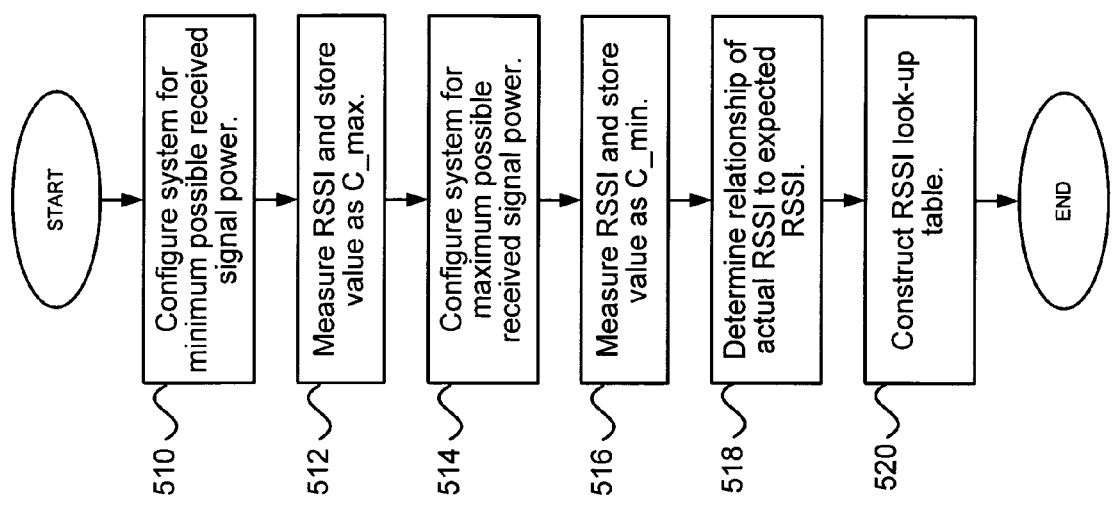
FIG. 5 is a flowchart that illustrates an exemplary method of calibrating the RSSI slope of a RF communication system, such as the transceivers of FIG. 1, using a look-up table, in accordance with an embodiment of the present invention.

FIG. 5 is a flowchart that illustrates an exemplary method of calibrating the RSSI slope of a RF communication system, such as the transceivers 110, 120 of FIG. 1, using a look-up table, in accordance with an embodiment of the present invention. The calibration begins by configuring the RF communication system to receive a RF signal at a power level at or below a level corresponding to the largest possible RSSI (block 510). A measurement of RSSI is then made, and the value is stored as C_max (block 512). The system is then configured to receive a RF signal at a power level at or above a level corresponding to the smallest possible RSSI (block 514). A measurement of RSSI is then made, and the value is stored as C_min (block 516). The values of C_max, C_min, the maximum desired RSSI, RSSI_desired_max, and the minimum desired RSSI, RSSI_desired_min, are then used to determined the relationship of the actual/observed RSSI to the expected/desired RSSI (block 518). Finally, a look-up table is constructed using the relationship of actual/observed RSSI, and the determined relationship (block 520). The look-up table may then be used in translating actual/observed RSSI values into value of RSSI expected by the operational algorithms of a RF communication system such as, for example, the transceivers 110, 120 of FIG. 1.

As described above, the operational algorithms contained in the memory 335 and executed by the processor 345 shown in FIG. 3 may have one or more predetermined thresholds used as decision points or factors in the management of the RF communication devices such as, for example, the transceivers 110, 120 of FIG. 1. The embodiment of the present invention described above with respect to FIG. 4 converts an actual/observed RSSI from the RSSI circuit 240 of FIG. 2 into an expected RSSI for use in the algorithms of the processor 345 of FIG. 3. In such an embodiment, a value within a range of actual/observed RSSI values is converted to a value within a range of expected or desired RSSI values. The converted value may then be compared to predefined thresholds within the algorithms executed by the processor 345. In an alternative embodiment of the present invention, the inverse of the relationship between the actual/observed RSSI and the expected RSSI values may be used to modify predefined thresholds within the range of expected RSSI values, into thresholds within the range of actual/observed RSSI values. For example, using the equations above, an expression may be derived that allows the computation of the modified threshold, RSSI_mod_th, from the original or base threshold, RSSI_base_th.

$$RSSI\_mod\_th = (RSSI\_base\_th - RSSI\_desired\_min) * (C\_max - C\_min)/RSSI\_desired\_range + C\_min$$

The modified expected RSSI threshold values may be stored in a memory such as, for example, memory 355 of FIG. 3, for later access by operational algorithms. In this manner, an embodiment of the present invention may then use actual/observed RSSI values from an RSSI circuit such as, for example, the RSSI circuit 240 of FIG. 2, as input to the operational algorithms of a processor such as processor 345 of FIG. 3. The process of deriving modified threshold values may be repeated periodically, to ensure that the algorithms are using the most accurate threshold values according to the current relationship of the actual/observed RSSI curve A 420, and the expected RSSI curve B 410.

Figure 5A:
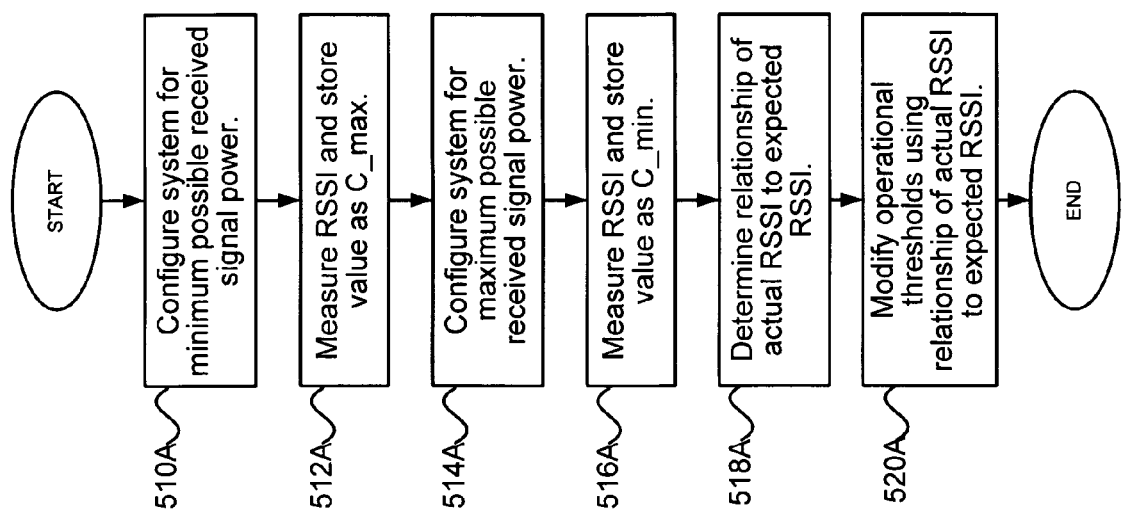
FIG. 5A is a flowchart that illustrates an exemplary method of modifying the thresholds in the operational algorithms of a RF communication system, such as the transceivers of FIG. 1, to compensate for the variation of actual RSSI from the expected RSSI, in accordance with an embodiment of the present invention.

FIG. 5A is a flowchart that illustrates an exemplary method of modifying the thresholds in the operational algorithms of a RF communication system, such as the transceivers 110, 120 of FIG. 1, to compensate for the variation of actual RSSI from the expected RSSI, in accordance with an embodiment of the present invention. The calibration begins by configuring the RF communication system to receive a RF signal at a power level at or below a level corresponding to the largest possible RSSI (block 510A). A measurement of RSSI is then made, and the value is stored as C_max (block 512A). The system is then configured to receive a RF signal at a power level at or above a level corresponding to the smallest possible RSSI (block 514A). A measurement of RSSI is then made, and the value is stored as C_min (block 516A). The values of C_max, C_min, the maximum desired RSSI, RSSI_desired_max, and the minimum desired RSSI, RSSI_desired_min, are then used to determined the relationship of a modified RSSI threshold, RSSI_mod_th, to a base RSSI threshold, RSSI_base_th, as shown above (block 518A). Finally, the values of each of the operation thresholds in the algorithms of the RF communication system are adjusted using the relationship of modified RSSI to the base RSSI threshold values (block 520A). Once the modified RSSI threshold values are computed, the modified RSSI threshold values are used in place of the base RSSI threshold values in the operational algorithms of the RF communication system such as, for example, the transceivers 110, 120 of FIG. 1.

Figure 6:
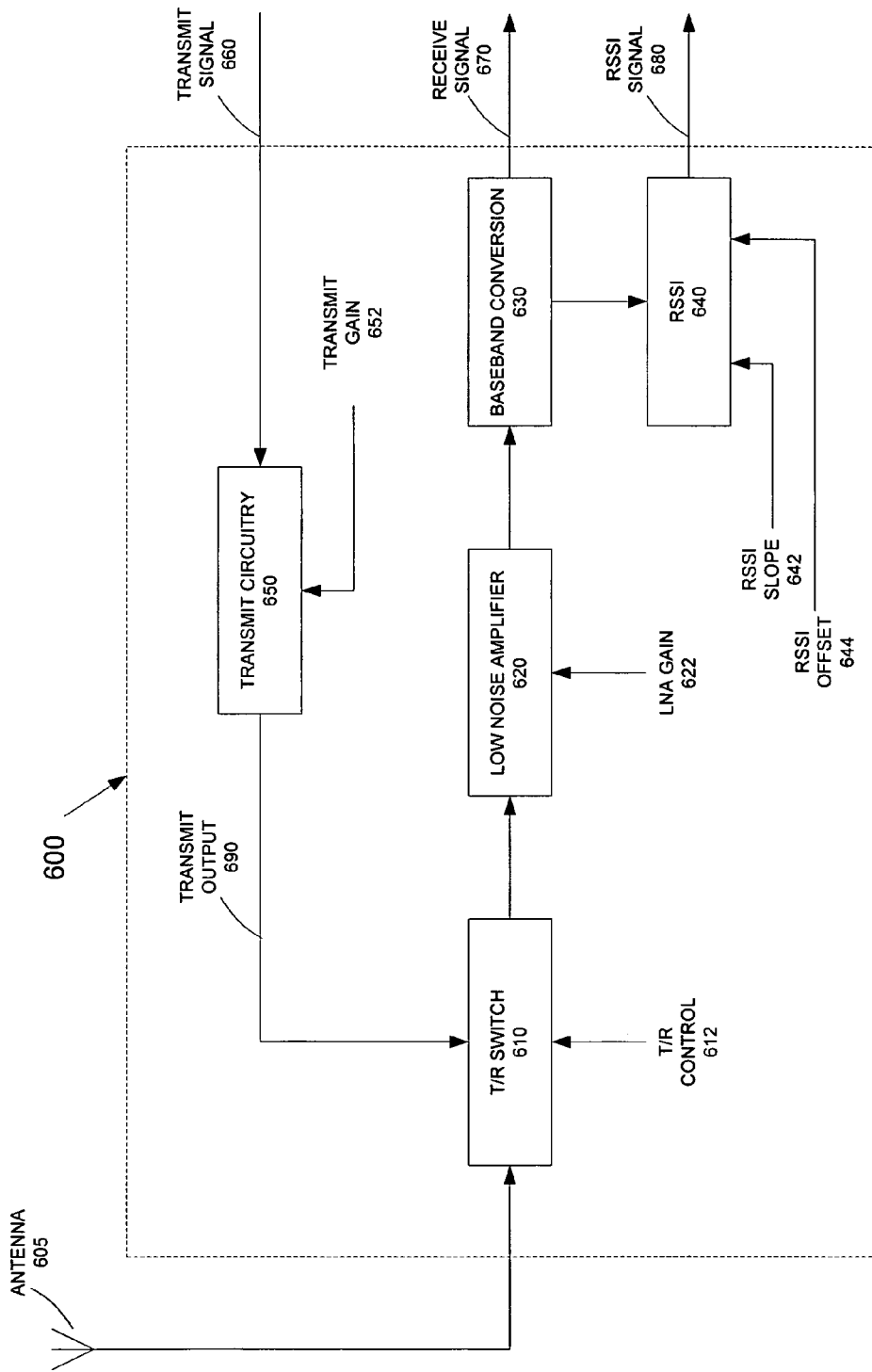
FIG. 6 shows a block diagram of an exemplary analog RF portion of a RF communication device that may correspond to, for example, the analog RF portion of the transceivers of FIG. 1, in accordance with an embodiment of the present invention.

FIG. 6 shows a block diagram of an exemplary analog RF portion 600 of a RF communication device that may correspond to, for example, the analog RF portion of the transceivers 110, 120 of FIG. 1, in accordance with an embodiment of the present invention. The analog RF portion 600 is similar to the analog RF portion 200 of FIG. 2, and is also characterized by a transmit path and a receive path. The transmit path of the analog RF portion 600 comprises transmit circuitry 650, a T/R switch 610, and an antenna 605. The transmit circuitry 650 receives a transmit signal 660 and generates a modulated RF transmit output signal 690. The transmit output signal 690 is coupled through the T/R switch 610 to antenna 605 for communication to a remote RF communication device such as, for example, another of the transceivers 110, 120 of FIG. 1. As with respect to FIGS. 1 and 2, it should be noted that although the antenna 605 is shown in FIG. 6 as a single antenna, this does not represent a limitation of the present invention. In various embodiments of the present invention, the antenna 605 may comprise multiple antennas in order to take advantage of, for example, diversity, beamforming, or space-time coded systems. The transmit circuitry 650 also accepts transmit gain signal 652, that permits the adjustment of the power level of transmit output signal 690.

The receive path of the analog RF portion 600 of FIG. 6 comprises a transmit/receive (T/R) switch 610, a LNA 620, a baseband conversion circuitry 630, and a RSSI circuit 640. The input of the T/R switch 610 is coupled to an antenna 605, that receives the transmit signal from another RF communication device such as the transceivers 110, 120 of FIG. 1. The T/R switch 610 may be configured in either a receive or a transmit mode of operation. In receive mode, the T/R switch 610 provides a low-loss connection from the antenna 605 to the input of the LNA 620. In transmit mode, the T/R switch 610 passes the transmit output signal 690 to the antenna 605, attenuates the transmit output signal 690 from the transmit circuitry 650, and provides the attenuated transmit output signal 690 to the input of the LNA 620. In an embodiment of the present invention, the T/R switch 610 may, for example, attenuate the transmit output signal 690 that is passed to the input of the LNA 620 by approximately 24 dB, when in the transmit mode.

The LNA 620 receives a RF signal from the output of the T/R switch 610, amplifies it, and passes the amplified signal to the baseband conversion circuit 630. The LNA 620 is configured with a LNA gain input 622 that permits the amount of amplification of the LNA 620 to be adjusted. The baseband conversion circuit 630 converts the RF signal received from the LNA 620 to a receive signal 670. The RSSI circuit 640 is coupled to the baseband conversion circuit 630, and generates a RSSI signal 680 that may be used as described above in managing the operation of the analog RF portion 600.

Although the majority of the analog RF portion 600 of FIG. 6 is the same as that of the analog RF portion 200 shown in FIG. 2, the RSSI circuit 640 of FIG. 6 is shown equipped with a RSSI slope input 642 and a RSSI offset input 644. An embodiment of the present invention may periodically perform a calibration of the output of a RSSI circuit such as, for example, the RSSI circuit 640. Such a calibration may use a RSSI slope input and a RSSI offset input such as, for example, the RSSI slope input 642 and the RSSI offset input 644 of FIG. 6. For example, RSSI slope calibration algorithms executed by a processor such as the processor 745 of FIG. 7, below, may adjust the range of RSSI values from the RSSI circuit 640 to match those expected by the operational algorithms of a RF communication device.

Figure 7:
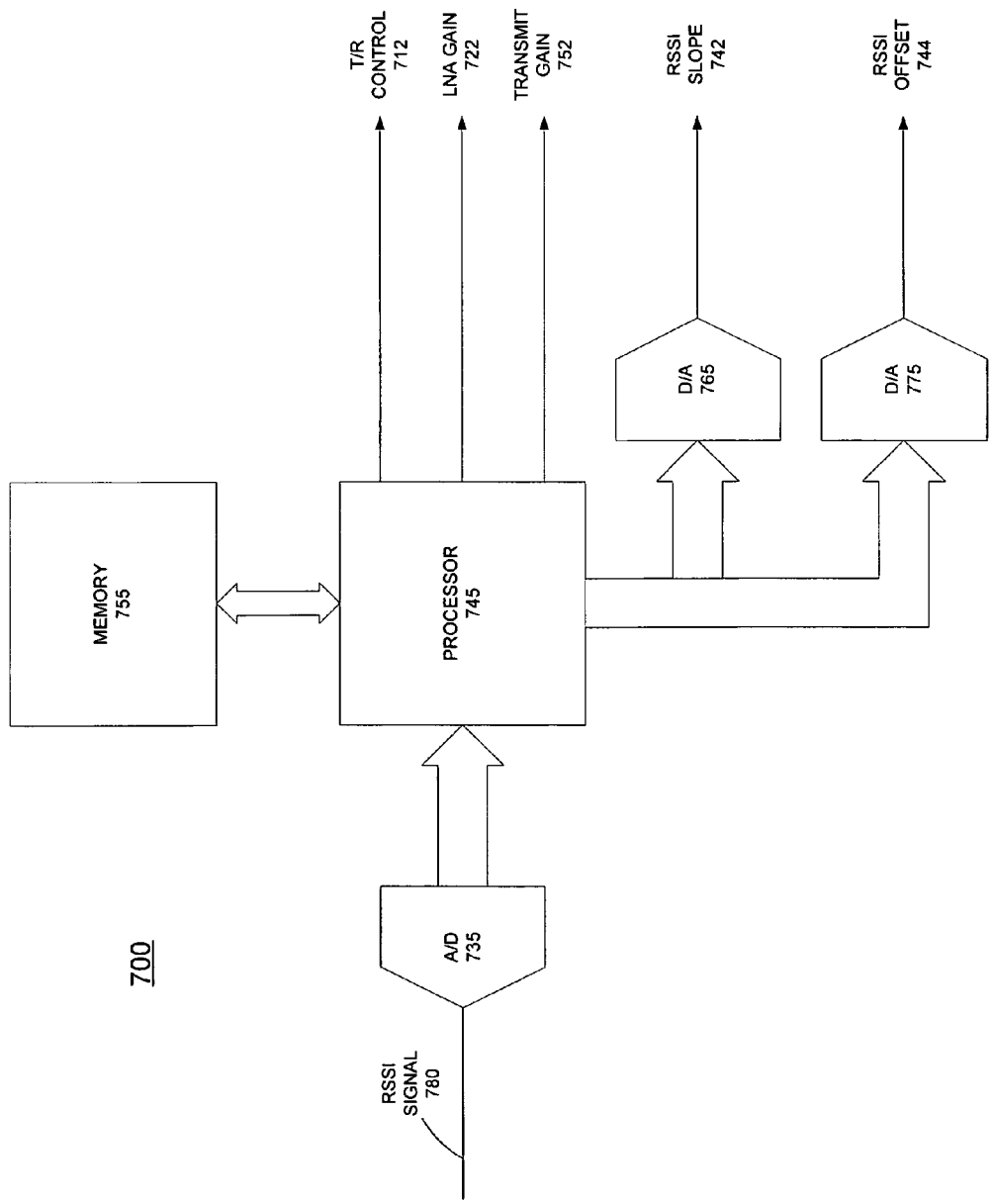
FIG. 7 shows a block diagram illustrating an exemplary digital portion of a RF communication device that may correspond to, for example, the digital portion of the transceivers of FIG. 1, in accordance with an embodiment of the present invention.

FIG. 7 shows a block diagram illustrating an exemplary digital portion 700 of a RF communication device that may correspond to, for example, the digital portion of the transceivers 110, 120 of FIG. 1, in accordance with an embodiment of the present invention. The digital portion 700 may be used in combination with an analog RF portion such as, for example, the analog RF portion 600 of FIG. 6, above. The digital portion 700 comprises an A/D converter circuit 735, a processor 745, and a memory 755. The digital portion 700 also comprises a digital-to-analog (D/A) converter 765, and D/A converter 775. The memory 755 may comprise, for example, non-volatile or volatile memory, and may be used to stored executable code or data, for use by the processor 745. In various embodiments of the present invention, the memory 755 may be contained within the processor 745. The A/D converter circuit 735 receives the RSSI signal 780 from an RSSI circuit such as, for example, the RSSI circuit 640 of FIG. 6. The digitized RSSI value generated by the A/D converter circuit 735 is then passed to processor 745. It is a function of the algorithms represented by the executable code contained in memory 755 to direct processor 745 to make operational decisions based, in part, upon the digitized RSSI value received from the A/D converter 735. The results of those decisions may be reflected in the states of the T/R control signal 312, the LNA gain signal 322, and the transmit gain signal 352 that may correspond to, for example, the T/R control signal 212, the LNA gain signal 222, and the transmit gain signal 252 of FIG. 2.

In an embodiment of the present invention, the D/A converter 765 and D/A converter 775 may be used to generate a RSSI slope signal 742 and a RSSI offset signal 744, respectively. The RSSI slope signal 742 and the RSSI offset signal 744 of FIG. 7 may correspond to the RSSI slope signal 642 and the RSI offset signal 644, respectively, of FIG. 6. In an embodiment of the present invention, a calibration algorithm in the processor 745 may periodically determine C_max and C_min, as described above with respect to FIG. 4, and may adjust the RSSI slope signal 742 and RSSI offset signal 744, in order to minimize the error between the curve A 420 of actual/observed RSSI values generated by the RSSI circuit 640, and the corresponding curve B 410 of expected RSSI values for the received RF signal power levels.

Figure 8:
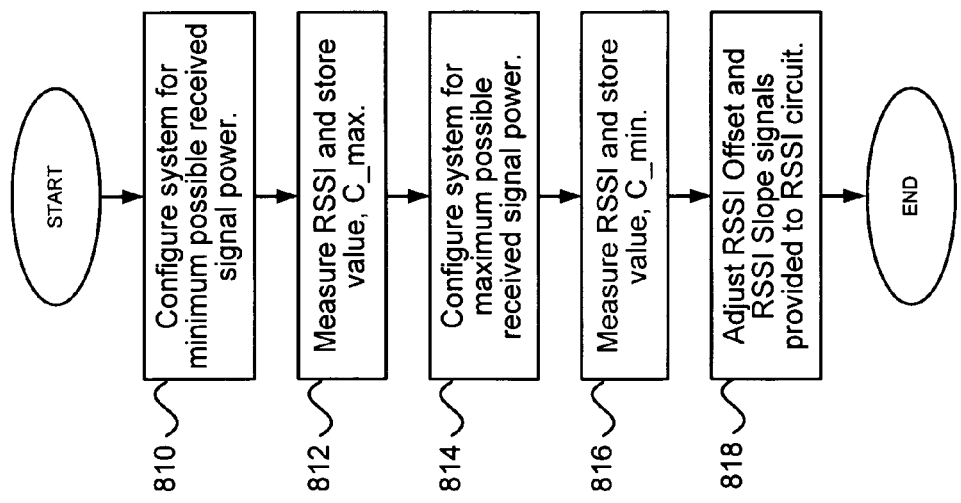
FIG. 8 is a flowchart illustrating an exemplary method of calibrating the RSSI slope of a RF communication system, such as the transceivers of FIG. 1, by adjusting the RSSI slope and RSSI offset of an RSSI circuit such as the RSSI circuit of FIG. 6, in accordance with an embodiment of the present invention.

FIG. 8 is a flowchart illustrating an exemplary method of calibrating the RSSI slope of a RF communication system, such as the transceivers 110, 120 of FIG. 1, by adjusting the RSSI slope and RSSI offset of an RSSI circuit such as the RSSI circuit 640 of FIG. 6, in accordance with an embodiment of the present invention. The calibration begins by configuring the RF communication system to receive a RF signal at a power level at or below a level corresponding to the largest possible RSSI (block 810). A measurement of RSSI is then made, and the value is stored as C_max (block 812). The system is then configured to receive a RF signal at a power level at or above a level corresponding to the smallest possible RSSI (block 814). A measurement of RSSI is then made, and the value is stored as C_min (block 816). The values of C_max, C_min, the maximum desired RSSI, RSSI_desired_max, and the minimum desired RSSI, RSSI_desired_min, may then be used to adjust RSSI offset and RSSI slope signals provided to RSSI circuitry, in order to minimize the error in the slope of curve A 420 from the slope of curve B 410 (block 818). As a result of this RSSI slope calibration, an RSSI signal such as, for example, the RSSI signal 680 of FIG. 6, may be digitized and used directly by the operational algorithms used in the management of RF communication device such as the transceivers 110, 120 of FIG. 1.

In other embodiments of the present invention, the results of an RSSI calibration such as that described above may be used in adjusting the operation of the transmitter portion of an associated RF communication system such as, for example, the transceivers 110, 120 of FIG. 1. In some embodiments of the present invention, roaming decisions based upon received signal power may affect the operation of an accompanying transmitter such as, for example, by selecting a change in operating frequency. An RSSI measurement circuit calibrated using an embodiment of the present invention may also be used for other calibration techniques. Such techniques may include, for example, the reduction of local oscillator leakage.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of operating a radio frequency communication system having a receiver portion circuitry and transmitter portion circuitry, the method comprising:

arranging the transmitter portion in a first transmitter configuration and the receiver portion in a first receiver configuration;

taking a first signal power measurement;

configuring the transmitter portion in a second transmitter configuration and the receiver portion in a second receiver configuration, wherein the first transmitter configuration is different than the second transmitter configuration and the first receiver configuration is different than the second receiver configuration;

performing a second signal power measurement; and adjusting the operation of the receiver portion based upon the first signal power measurement and the second signal power measurement, wherein the adjusting comprises modifying at least one threshold related to processing of receive signal strength indicator data used in the operation of the radio frequency communication system.

2. The method of claim 1 wherein the arranging, taking, configuring, performing, and adjusting occur on a periodic basis.

3. The method of claim 1 wherein the radio frequency communication system communicates digital information.

4. The method of claim 1 wherein the receiver portion and the transmitter portion are located within the same integrated circuit.

5. The method of claim 1 wherein the adjusting comprises calibrating at least one of a slope and a fixed offset of a receive signal strength indicator.

6. The method of claim 1 wherein the adjusting comprises modifying the value of a receive signal strength indicator using an affine function.

7. The method of claim 6 wherein the affine function is implemented using a look-up table.

8. The method of claim 1 wherein the adjusting comprises modifying at least one of a receive signal strength indicator slope and a receive signal strength indicator fixed offset in an analog receive signal strength indicator circuit.

9. The method of claim 1 wherein the arranging provides a relatively lower level of radio frequency signal to the receiver portion.

10. The method of claim 9 wherein the relatively lower level of radio frequency signal corresponds to a signal power of less than approximately −90 dBm.

11. The method of claim 1 wherein the configuring provides a relatively higher level of radio frequency signal to the receiver portion.

12. The method of claim 11 wherein the relatively higher level of radio frequency signal corresponds to a signal power of greater than approximately −30 dBm.

13. The method of claim 1 further comprising: adjusting the operation of the transmitter portion based upon the first signal power measurement and the second signal power measurement.

14. A radio frequency communication system comprising:
transmitter circuitry for generating a radio frequency signal, the output of the transmitter circuitry coupled to at least one antenna;
switching circuitry having an input coupled to the at least one antenna, an output, and at least a first mode and a second mode of operation, the first mode of the switching circuitry passing a signal from the input to the output with a relatively lower level of attenuation, and the second mode of the switching circuitry passing a signal from the input to the output with a relatively higher level of attenuation;
receiver circuitry for accepting a radio frequency signal from the output of the switching circuitry, the receiver circuitry producing at least a receive signal strength indicator; and
the radio frequency communication system adjusting at least one characteristic of the receive signal strength indicator based on two signal power measurements using the switching circuitry and the transmitter circuitry.

15. The system of claim 14 wherein the adjusting is performed on a periodic basis.

16. The system of claim 14 wherein the radio frequency communication system communicates digital information.

17. The system of claim 14 wherein the receiver circuitry and the transmitter circuitry are located within the same integrated circuit.

18. The system of claim 14 wherein the at least one characteristic comprises at least one of a slope and a fixed offset of the receive signal strength indicator.

19. The method of claim 14 wherein the adjusting comprises modifying the value of the receive signal strength indicator using an affine function.

20. The method of claim 19 wherein the affine function is implemented using a look-up table.

21. The method of claim 14 wherein the adjusting comprises modifying at least one threshold related to receive signal strength indicator data used in the operation of the radio frequency communication system.

22. A radio frequency communication system comprising:
transmitter circuitry configured to be arranged in first and second configurations, wherein the first configuration is different than the second configuration;
switching circuitry; and
receiver circuitry for accepting a radio frequency signal from the switching circuitry, the receiver circuitry producing at least a receive signal strength indicator;
the radio frequency communication system adjusting at least one characteristic of the receive signal strength indicator based on two signal power measurements using the switching circuitry and the transmitter circuitry.

* * * * *